(12) United States Patent
Lee

(10) Patent No.: US 7,705,954 B2
(45) Date of Patent: Apr. 27, 2010

(54) LIQUID CRYSTAL DISPLAY DEVICE AND METHOD OF FABRICATING THE SAME

(75) Inventor: Chang Deok Lee, Cheongju-si (KR)

(73) Assignee: LG. Display Co., Ltd., Seoul (KR)

( * ) Notice: Subject to any disclaimer, the term of this patent is extended or adjusted under 35 U.S.C. 154(b) by 494 days.

(21) Appl. No.: 11/448,261

(22) Filed: Jun. 7, 2006

(65) Prior Publication Data

US 2007/0153148 A1    Jul. 5, 2007

(30) Foreign Application Priority Data

Dec. 30, 2005    (KR) ...................... 10-2005-0134663

(51) Int. Cl.
  *G02F 1/1333*  (2006.01)
  *G02F 1/1345*  (2006.01)
(52) U.S. Cl. ........................ 349/152; 349/138; 349/149; 349/151
(58) Field of Classification Search ......... 349/149–152, 349/138
  See application file for complete search history.

(56) References Cited

U.S. PATENT DOCUMENTS 6,335,211 B1    1/2002  Lee

2005/0046762 A1 *  3/2005  Kim et al. ...................... 349/38
2005/0077517 A1    4/2005  Chang et al.
2005/0088591 A1 *  4/2005  Lee et al. ..................... 349/113
2005/0263769 A1 * 12/2005  Chul Ahn ..................... 257/72
2005/0270451 A1   12/2005  Ahn

OTHER PUBLICATIONS

Search and Examination Report dated Oct. 13, 2006 for corresponding U.K. Patent Application No. GB0611787.3.

* cited by examiner

*Primary Examiner*—David Nelms
*Assistant Examiner*—Jessica M Merlin
(74) *Attorney, Agent, or Firm*—Brinks Hofer Gilson & Lione

(57) ABSTRACT

An LCD and a fabrication method thereof are provided. The LCD includes a gate pad. The gate pad includes a gate ITO electrode formed on a substrate, a first and a second gate pad bottom electrode formed on a predetermined region of the gate ITO electrode, a gate insulating layer formed on the first and the second gate pad bottom electrode, a passivation layer formed on the gate insulating layer, a gate pad top electrode formed on the passivation layer, and at least one contact hole. The LCD further comprises a liquid crystal panel having a gate line that has a dual structure integrally formed with the first gate pad bottom electrode and the second gate pad bottom electrode.

41 Claims, 9 Drawing Sheets

Prior Art

LIQUID CRYSTAL DISPLAY DEVICE AND METHOD OF FABRICATING THE SAME

The present application claims the benefit of Korean Patent Application No. 2005-134663 filed in Korea on Dec. 30, 2005, which is hereby incorporated by reference.

FIELD

The present invention relates to a liquid crystal display device, and more particularly, to a liquid crystal display device and a method of fabricating the same for improving reliability by preventing electrolytic corrosion of a gate pad.

BACKGROUND

The information society demands various forms and types of display devices. In order to satisfy such a demand, many researches have been made to develop flat panel display devices such as a liquid crystal display device (LCD), a plasma display panel (PDP) and an electro luminescent display (ELD). Some of the flat panel display devices have been already utilized by various equipments.

Among the flat panel display devices, LCDs are widely used as a mobile display device instead of a cathode tube display device due to advantages of the LCD such as lightweight, slim profile and low power consumption. The LCDs are developed in various forms such as monitors for notebook computers and for television.

LCDs display images using characteristics of liquid crystals, optical anisotropy and polarization. Since a liquid crystal molecule is long and thin, arrangement of molecules in a liquid crystal has directivity. The directivity of the molecule arrangement may be controlled by supplying electric field to the liquid crystal.

If the directivity of the molecule arrangement in the liquid crystal is controlled by artificially supplying the electric field to the liquid crystal, the molecule arrangement in the liquid crystal is transformed and the optical anisotropy changes the polarization of the light in a direction of the molecule arrangement of the liquid crystal. That is, the LCD displays image data by controlling the directivity of the molecule arrangement in the liquid crystal.

FIG. 1 is a plan view of a first substrate of a liquid crystal display device according to the related art.

As shown in FIG. 1, a gate line 4 and a data line 6 crossly arranged on the first substrate of the conventional LCD to define a pixel area, and a thin film transistor (TFT) is disposed at the crossing of the gate line 4 and the data line 6. Also, a gate pad 30 is formed on the first substrate to be connected to the gate line 4, and a data pad 25 is formed on the first substrate to be connected to the data line 6.

The TFT includes a gate electrode 5 integrally formed with the gate line 4, an active layer 8 formed on the gate electrode 5, a source electrode 7a integrally formed with the data line 6 on the active layer 8, and a drain electrode 7b separated from the source electrode 7a at a predetermined distance. The drain electrode 7b is connected to a pixel electrode 12 through a drain contact hole H.

The data pad 25 supplies a data voltage to the data line 6 by being connected to a data driver (not shown). The data pad 25 includes a data pad bottom electrode 16 extended from the data line 6 and a data pad top electrode 20 connected to the data pad bottom electrode 16 through a contact hole (H).

The gate pad 30 supplies a scan signal to the gate line 4 by being connected to a gate driver (not shown). The gate pad 30 includes a gate pad bottom electrode 14 extended from the gate line 4 and a gate pad top electrode 18 connected to the gate pad bottom electrode 14 through a plural of contact holes H1 and H2.

FIG. 2 is a cross-sectional view of FIG. 1 taken along a line A-A'.

As shown in FIG. 2, a first gate pad bottom electrode 14a and a second gate pad bottom electrode 14b are formed on a transparent substrate 1 to configure the gate pad bottom electrode 14. A gate insulating layer 11 is formed on the first and the second gate pad bottom electrode 14a and 14b and a passivation layer 13 is formed on the gate insulating layer 11.

A plurality of contact holes H1 and H2 is formed on the transparent substrate 1 where the passivation layer 13 is formed, and a gate pad top electrode 18 is formed on the plurality of the contact holes H1 and H2.

The first gate pad bottom electrode 14a is made of aluminum group metal, the second gate pad bottom electrode 14b is made of a molybdenum (Mo) group metal, and the gate pad top electrode 18 is made of an ITO group metal. The gate pad top electrode 18 is made of material identical to the pixel electrode 12.

While forming the first gate pad bottom electrode 14a made of aluminum on the substrate 1, if the aluminum contacts oxygen in air, the first gate pad bottom electrode 14a is corroded. In order to prevent the first gate pad bottom electrode 14a from being corroded, the second gate pad bottom electrode 14b is formed on the first pad bottom electrode 14a.

Since the second gate pad bottom electrode 14b is made of a high-resistive metal, the second gate pad bottom electrode 14b is formed on the first pad bottom electrode 14a in a shape of thin film. The first gate pad bottom electrode 14a and the gate pad top electrode 18 are connected through a plurality of contact holes H1 and H2. Since the second gate pad bottom electrode 14b is the high resistive metal as described above, the electricity is not passed through if the gate pad top electrode 18 is connected to the second gate pad bottom electrode 14b.

Therefore, the first gate pad bottom electrode 14a and the gate pad top electrode 18 are connected through a plurality of contact holes H1 and H2.

Since an insulating layer and a passivation layer are not formed on the gate pad top electrode 18, the gate pad top electrode 18 is exposed to air. If the gate pad top electrode 18 is exposed to air, moisture in air penetrates into the first gate pad bottom electrode 14a through the gate pad top electrode 18.

If the first gate pad bottom electrode 14a contacts the moisture in air, the moisture corrodes the first gate pad bottom electrode 14a made of aluminum. Such a corroded first gate pad bottom electrode 14a disturbs a scan signal to be transferred from the gate driver to the gate line 4 connected to the gate pad 30. Also, the corrosion of the first gate pad bottom electrode 14a may corrode the gate line 4 which is integrally formed with the first pad bottom electrode 14a.

SUMMARY

Accordingly, the present invention is directed to a liquid crystal display device and a method of fabricating the same that substantially obviates one or more problems due to limitations and disadvantages of the related art.

A liquid crystal display device includes a gate pad. The gate pad comprises a gate ITO electrode formed on the substrate, a first gate pad bottom electrode and a second gate pad bottom electrode formed on a predetermined region of the gate ITO electrode, a gate insulating layer formed on the first gate pad bottom electrode and the second gate pad bottom electrode, a passivation layer formed on the gate insulating layer, a gate pad top electrode formed on the passivation layer, and at least one contact hole. The liquid display device further comprises a liquid crystal panel that has a gate line that has a dual structure integrally formed with the first gate pad bottom electrode and the second gate pad bottom electrode.

In another aspect of the present invention, a method of fabricating a liquid crystal display device includes forming a gate ITO electrode on a substrate, forming a first gate metal and a second gate metal on the gate ITO electrode, and forming a first gate pad bottom electrode and a second gate pad bottom electrode on a first predetermined region of the gate ITO electrode. The method of fabricating a liquid crystal display device further includes forming a gate insulating layer and a passivation layer on the first gate pad bottom electrode and the second gate pad bottom electrode, etching a predetermined region of the gate insulating layer and the passivation layer to expose a second predetermined region of the gate ITO electrode, and forming a gate pad top electrode on the exposed gate insulating layer and the passivation layer.

In a further aspect of the present invention, a method of fabricating a liquid crystal display device includes forming a first metal layer, a second metal layer and a third metal layer on a substrate in sequence. The method of fabricating a liquid crystal display device further includes forming a gate electrode, a gate line and a gate pad on the third metal layer. The method of fabricating a liquid crystal display device also includes forming a passivation layer on the substrate where the gate electrode is formed, forming at least one contact hole, and forming a pixel electrode in a pixel region and forming a gate pad top electrode at the gate pad region.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
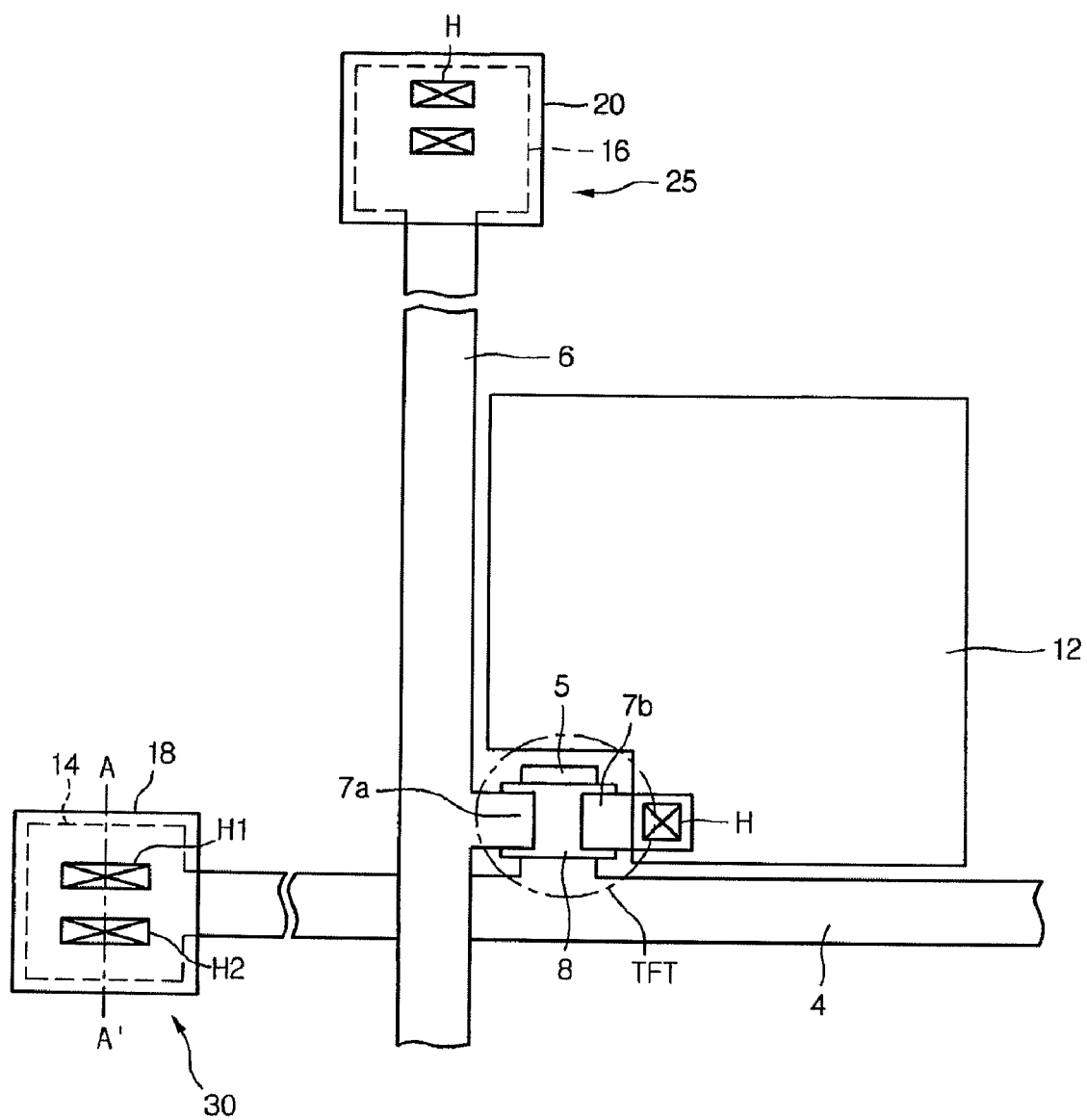
FIG. 1 is a plan view of a first substrate of a liquid crystal display device according to the related art.
Figure 2:
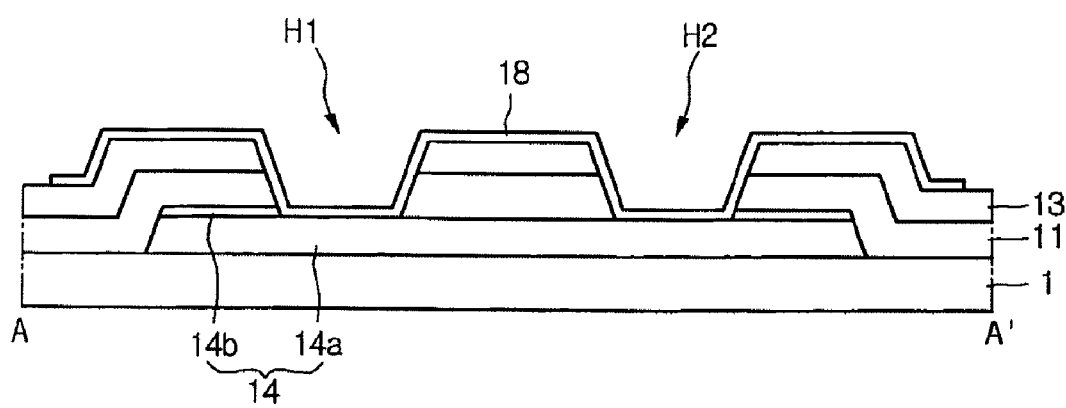
FIG. 2 is a cross-section view of FIG. 1 taken along a line A-A'.
Figure 3:
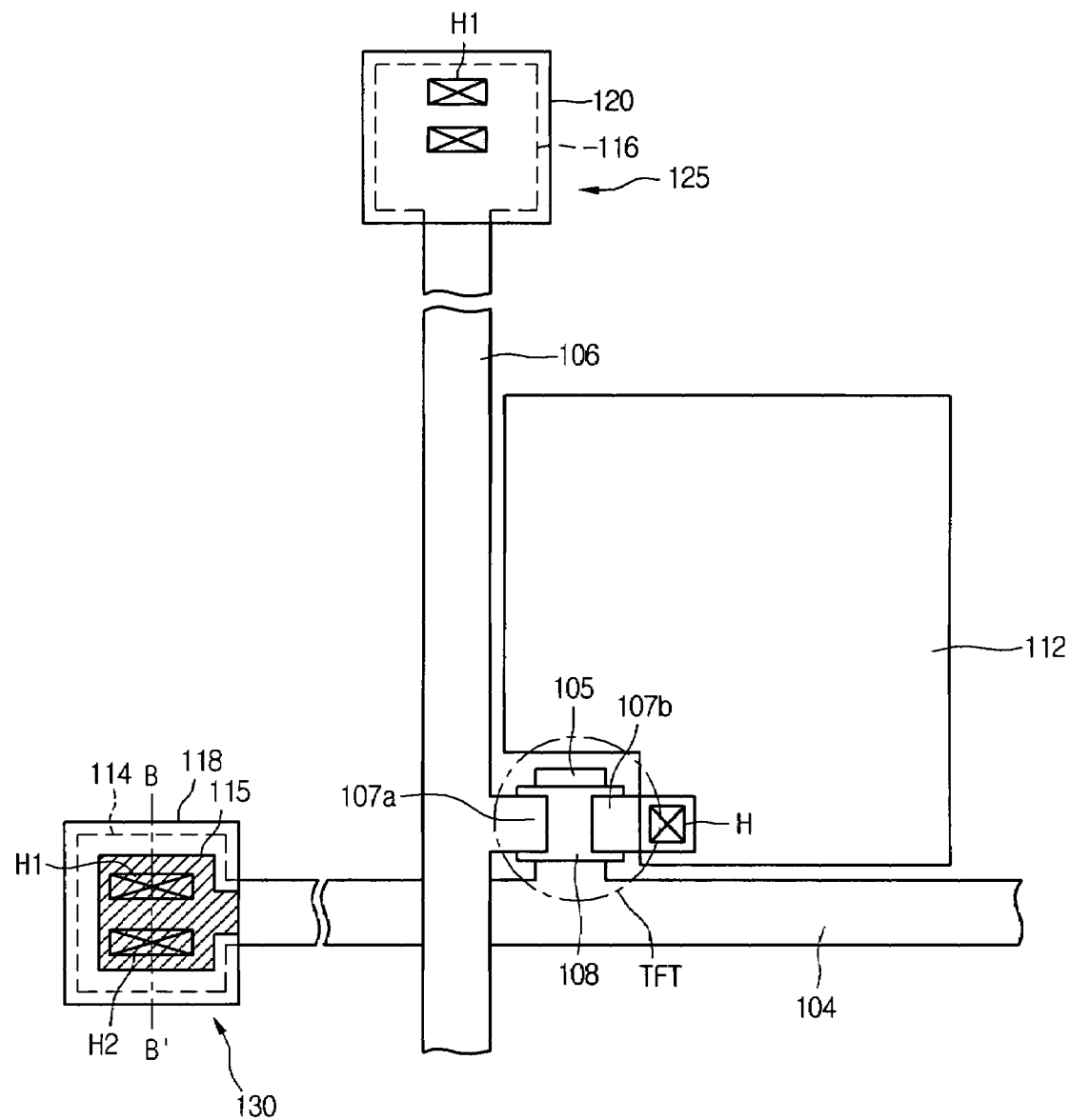
FIG. 3 is a block diagram illustrating a first substrate of a liquid crystal display device according to a first embodiment of the present invention.

FIG. 3 is a block diagram illustrating a first substrate according to a first embodiment of the present invention.

As shown in FIG. 3, a gate line 104 and a data line 106 are crossly arranged on a first substrate to define a pixel region, and a thin film transistor (TFT) is formed at the crossing of the gate line 104 and the data line 106. A gate pad 130 is formed on the first substrate to be connected to the gate line 104, and a data pad 125 is also formed on the first substrate to be connected to the data line 106.

The thin film transistor (TFT) includes a gate electrode 105 integrally formed with the gate line 104, an active layer 108 formed on the gate electrode 105, a source electrode 107a integrally formed with the data line 106 on the active layer 108, and a drain electrode 107b separated from the source electrode 107 at a predetermined distance. The drain electrode 107b is connected to a pixel electrode 112 through a drain contact hole H.

A data pad 125 supplies a data voltage to the data line 106 by being connected to a data driver (not shown). The data pad 125 is configured of a data pad bottom electrode 116 extended from the data line 106 and a data pad top electrode 120 connected to the data pad bottom electrode 116 through a plurality of contact holes H1.

The gate pad 130 supplies a scan signal to the gate line 104 by being connected to a gate driver (not shown). The gate pad 130 includes a gate ITO electrode 115 made of a transparent conductive metal ITO, a gate pad bottom electrode 114 extended from the gate line 104 on the gate ITO electrode 115, and a gate pad top electrode 118 connected to the gate pad bottom electrode 114 through a plurality of contact holes H1 and H2. The gate pad 130 may include at least two contact holes H1 and H2.

Figure 4:
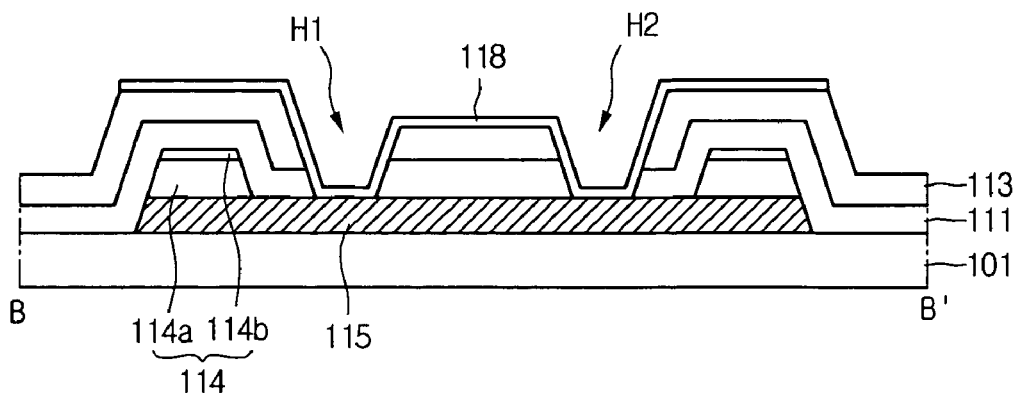
FIG. 4 is a cross section view of FIG. 3 taken along a line B-B'.

FIG. 4 is a cross section view of FIG. 3 taken along a line B-B'.

As shown in FIGS. 3 and 4, a first metal layer made of ITO material or IZO material is formed on a transparent substrate 101. Then, a second metal layer made of aluminum or aluminum alloy and a third metal layer made of molybdenum or molybdenum alloy are formed on the first metal layer in sequence.

Then, a photo process and a patterning process are performed for forming a gate ITO electrode 115 on a gate pad region, forming first gate pad bottom electrodes 114a on a left side and a right side of the gate ITO electrode 115, and forming second pad bottom electrodes 114b on the first pad bottom electrodes 114a. Herein, a diffraction exposure mask or a halftone mask is used.

The photo process and the patterning process are simultaneously performed with a process for forming a gate electrode and a gate line of a liquid crystal display device.

After that, a gate insulating layer 111 is formed on the second gate pad bottom electrode 114b and a passivation layer 113 is formed on the gate insulating layer 111.

A plurality of contact holes H1 and H2 are formed on the passivation layer 113, and a gate pad top electrode 118 is formed on the plurality of contact holes H1 and H2. The gate pad top electrode 118 is connected to the gate ITO electrode 115 through the plurality of the contact holes H1 and H2. The gate ITO electrode 115 and the gate pad top electrode 118 are made of a same material as the pixel electrode 112.

As described above, the gate ITO electrode 115 is made of ITO material, the first gate pad bottom electrode 114a is made of aluminum material, the second gate pad bottom electrode 114b is made of molybdenum material and the gate pad top electrode 118 is made of the ITO material.

FIGS. 5A through 5E show a method of fabricating a gate pad according to an embodiment of the present invention.

Figure 5A:
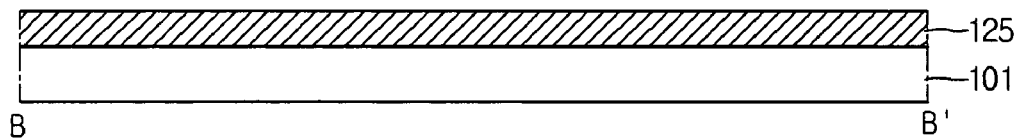
FIGS. 5A through 5E shows a method of fabricating a gate pad according to an embodiment of the present invention.

As shown in FIG. 5A, a first metal layer 125 made of ITO material or IZO material is formed on a transparent substrate 101. Then, a second metal layer 127 made of aluminum or aluminum alloy is formed on the first metal layer 125 and a third metal layer 129 made of molybdenum or molybdenum alloy is formed on the second metal layer 127.

Figure 5B:
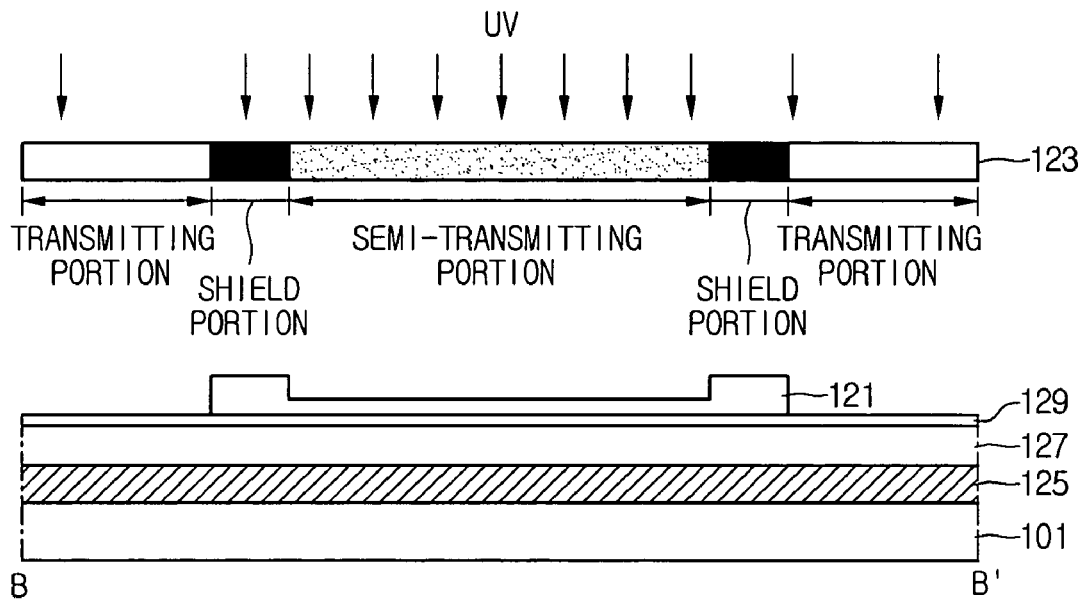

After continuously forming three metal layers, a photo-resist is coated on the substrate 101 and an ultra violet (UV) ray or an optical beam is radiated using a mask 123 as shown in FIG. 5B. Herein, the mask 123 includes a transmitting portion for transmitting 100% of the UV or the optical beam, a semi-transmitting portion for transmitting a predetermined portion of the UV or the optical beam, and a shielding portion for completely blocking the UV or the optical beam. Herein, the semi-transmitting portion may be formed as a diffraction slit or a halftone pattern.

After completely finishing the exposure process, a photo-resist pattern 121 having different thickness regions is formed on the third metal layer 129.

Figure 5C:
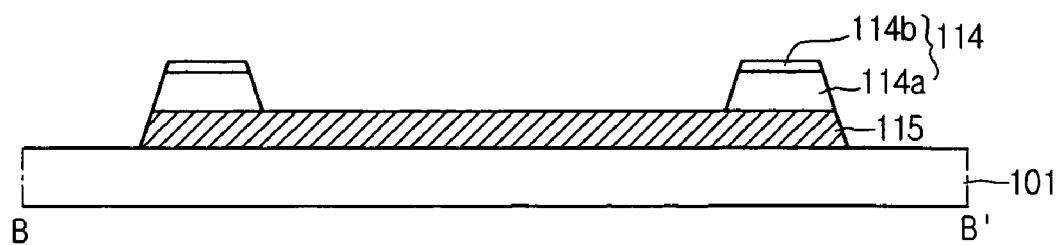

As shown in FIG. 5C, an etching process is performed using the photo-resist pattern 121 as the mask to form a first and a second gate pad bottom electrode 114a and 114b on a left side and a right side of the gate ITO electrode 115.

Although it is not shown in the accompanying drawings, a gate line and a gate electrode are formed in other regions excepting the gate pad region.

Figure 5D:
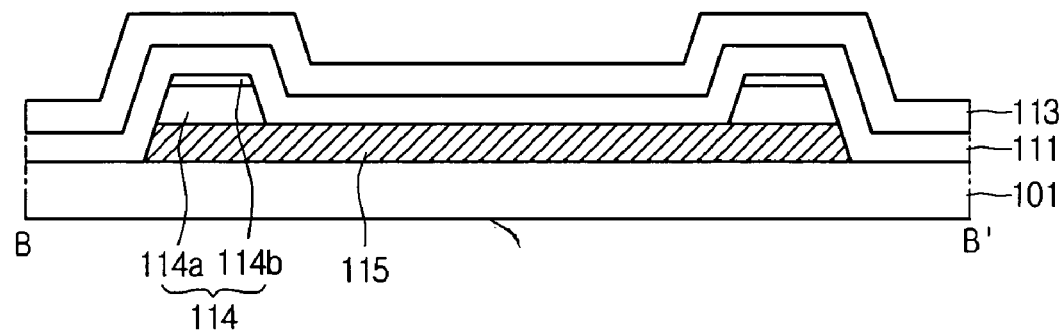

As shown in FIG. 5D, a gate insulating layer 111 is formed on the first and the second gate pad bottom electrode 114a and 114b, and a passivation layer 113 is formed on the gate insulating layer 111.

After forming the gate insulating layer 111 on the substrate 101, a channel layer, an ohmic contact layer, a source/drain electrode are formed on a gate electrode region at the same time or through performing several independent processes.

After forming the source/drain electrode, a passivation layer 113 is formed on the entire surface of the substrate 101. Since the channel layer, the ohmic contact layer and the source/drain electrode are not formed in the gate pad region, the passivation layer 113 is directly formed on the gate insulating layer 111.

Figure 5E:
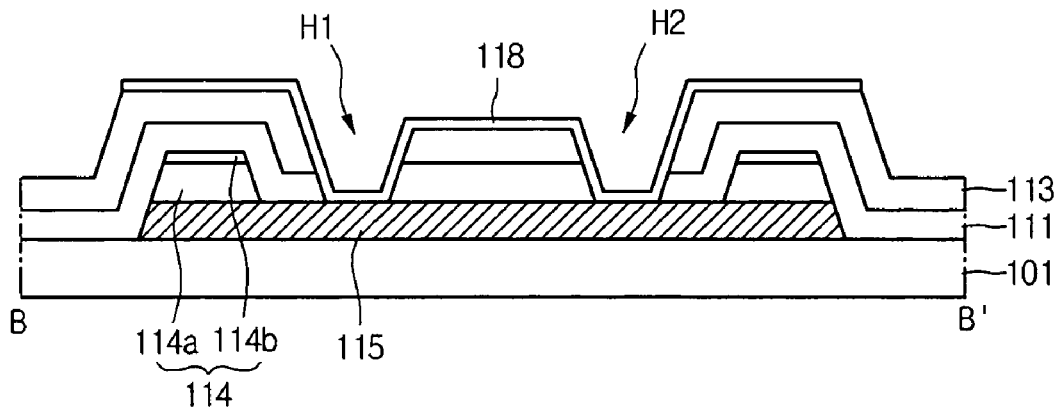

A plurality of contact holes H1 and H2 is formed on the passivation layer 113 to expose a predetermined region of the gate ITO electrode 115, and a gate pad top electrode 118 is formed on the plurality of contact holes H1 and H2 as shown in FIG. 5E. The gate pad top electrode 118 is connected to the gate ITO electrode 115.

The gate pad top electrode 118 is formed by forming an ITO metal on the entire region of the substrate 101 and patterning the ITO metal in order to form a pixel electrode at a pixel region, the gate pad top electrode 118 in the gate pad region and a data pad top electrode in the data pad region.

The gate pad top electrode 118 is not electrically connected to the first and the second gate pad bottom electrode 114a and 114b because the first and the second gate pad bottom electrode 114a and 114b are surrounded by the gate insulating layer 111 and the passivation layer 113.

The gate pad top electrode 118 exposed to air is electrically connected to the gate ITO electrode 115 and not electrically connected to the first and the second gate pad bottom electrodes 114a and 114b. As described above, the first pad bottom electrode 114a is not connected to the gate pad top electrode 118 to prevent the first pad bottom electrode 114a from being corroded because the first gate pad bottom electrode 114a is made of aluminum that is easily corroded by moisture in air.

In order to form the first gate pad bottom electrode 114a not to be connected to the gate pad top electrode 118, the gate ITO electrode 115 is formed on the substrate 101 and the gate ITO electrode 115 is connected to the gate pad top electrode 118. Herein, the first and the second gate pad bottom electrodes 114a and 114b are not connected to the gate pad top electrode 118.

The gate pad top electrode 118 is exposed to external air, and moisture in the air penetrates through the gate pad top electrode 118. The moisture penetrated through the gate pad top electrode 118 may contact the gate ITO electrode 115.

Although the moisture penetrates into the gate ITO electrode 115 through the gate pad top electrode 118, the corrosion problem of the conventional LCD does not arise because the gate ITO electrode 115 is not corroded by the moisture.

The method of fabricating a liquid crystal device according to the first embodiment comprises forming the first gate pad bottom electrode not to be connected to the gate pad top electrode by forming the gate ITO electrode on the substrate when the gate pad is formed in order to prevent the first gate pad bottom electrode from being corroded.

Figure 6:
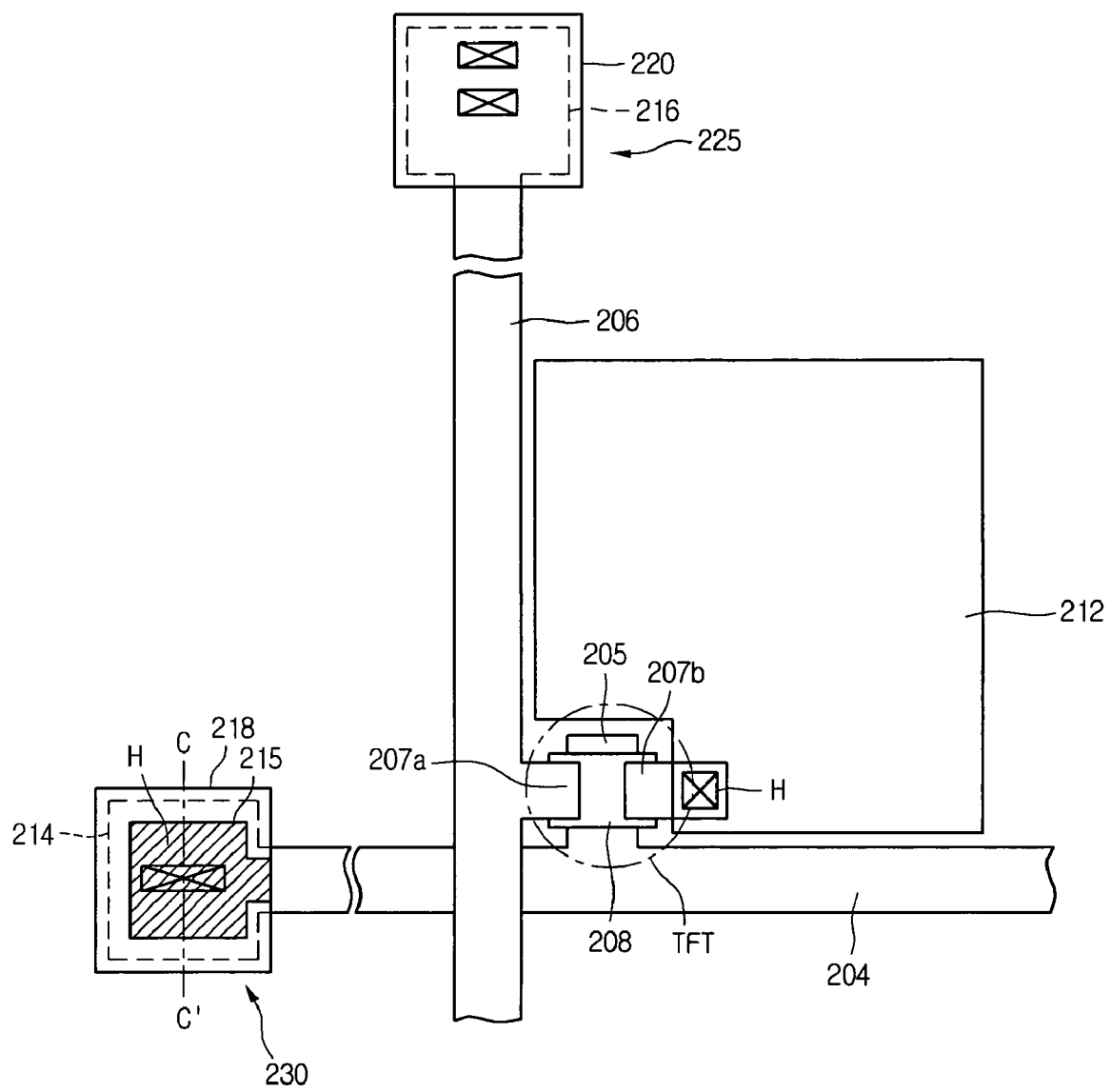
FIG. 6 is a plan view of a first substrate of a liquid crystal display device according to a second embodiment of the present invention.

FIG. 6 is a plan view of a first substrate of a liquid crystal display device according to a second embodiment of the present invention.

As shown in FIG. 6, a gate line 204 and a data line 206 are crossly arranged on a first substrate to define a pixel region, and a thin film transistor (TFT) is formed at the crossing of the gate line 204 and the data line 206. A gate pad 230 is formed on the first substrate to be connected to the gate line 204, and a data pad 225 is also formed on the first substrate to be connected to the data line 206.

The thin film transistor (TFT) includes a gate electrode 205 integrally formed with the gate line 204, an active layer 208 formed on the gate electrode 205, a source electrode 207a integrally formed with the data line 206 on the active layer 208, and a drain electrode 207b separated from the source electrode 207a at a predetermined distance. The drain electrode 207b is connected to a pixel electrode 212 through a drain contact hole H.

The data pad 225 supplies a data voltage to the data line 206 by being connected to a data driver (not shown). The data pad 225 is configured of a data pad bottom electrode 216 extended from the data line 206 and a data pad top electrode 220 connected to the data pad bottom electrode 216 through a single contact hole H.

The gate pad 230 supplies a scan signal to the gate line 204 by being connected to a gate driver (not shown). The gate pad 230 includes a gate ITO electrode 215 made of a transparent conductive metal ITO, a gate pad bottom electrode 214 extended from the gate line 204 on the gate ITO electrode 215, and a gate pad top electrode 218 connected to the gate pad bottom electrode 214 through one contact hole H1.

Figure 7:
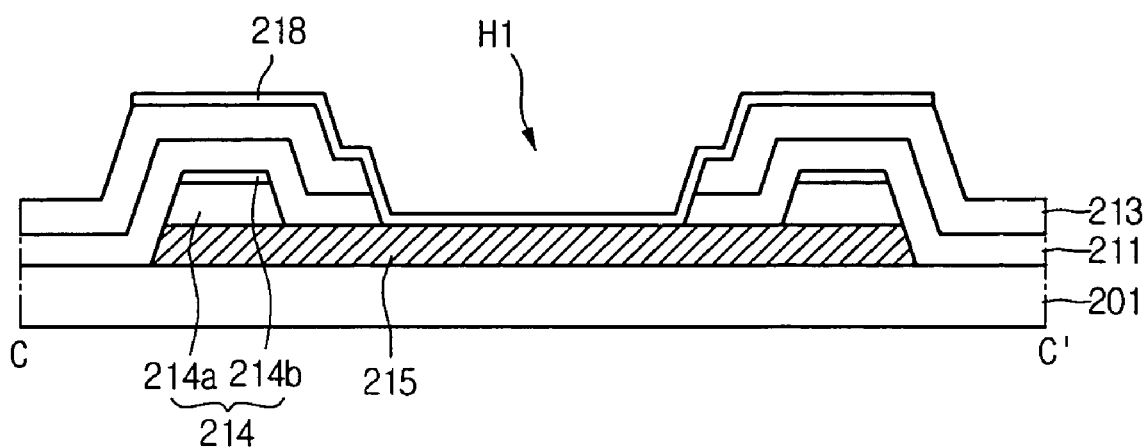
FIG. 7 is a cross-sectional view of FIG. 6 taken along a line C-C'.

FIG. 7 is a cross-sectional view of FIG. 6 taken along a line C-C'.

As shown in FIG. 7, a gate ITO electrode 215, a first gate pad bottom electrode 214a and a second gate pad bottom electrode 214b are formed through the processes described with reference FIG. 4 and FIGS. 5A through 5C. The gate pad bottom electrode 214 is configured of the first gate pad bottom electrode 214a and a second gate pad bottom electrode 214b. Such a gate pad bottom electrode 214 is formed at both edges of the gate ITO electrode 215.

A gate insulating layer 211 is formed on the substrate 201 where the second gate pad bottom electrode 214b is formed, and a passivation layer 213 is formed on the substrate 201 where the gate insulating layer 211 is formed. A contact hole H1 is formed on the passivation layer 213 to expose a center of the gate ITO electrode 215. A gate pad top electrode 218 is formed to be connected to the gate ITO electrode 215 through the contact hole H1.

Such a fabrication process is identical to the method of fabrication according to the first embodiment. Therefore, details thereof are omitted.

The gate ITO electrode 215 is connected to the gate pad top electrode 218, and the first gate pad bottom electrode 214a formed on the gate ITO electrode 215 is patterned not to be connected to the gate pad top electrode 218. The gate ITO electrode 215 and the gate pad top electrode 218 are made of ITO material metal or IZO material metal, and the first gate pad bottom electrode 214a is made of aluminum or aluminum alloy. The second gate pad bottom electrode 214b is made of molybdenum or molybdenum alloy.

Although moisture in external air penetrates the gate ITO electrode 215 through the gate pad top electrode 218 because the gate pad top electrode 218 is externally exposed, the gate ITO electrode 215 is not corroded by the moisture.

Although the moisture penetrates the gate ITO electrode 215 through the gate pad top electrode 218, the corrosion problem of the conventional LCD is does not arise because the gate ITO electrode 215 is not corroded by the moisture.

The method of fabricating a liquid crystal device according to the second embodiment comprises forming the first gate pad bottom electrode not to be connected to the gate pad top electrode by forming the gate ITO electrode on the substrate when the gate pad is formed in order to prevent the first gate pad bottom electrode from being corroded.

Figure 8:
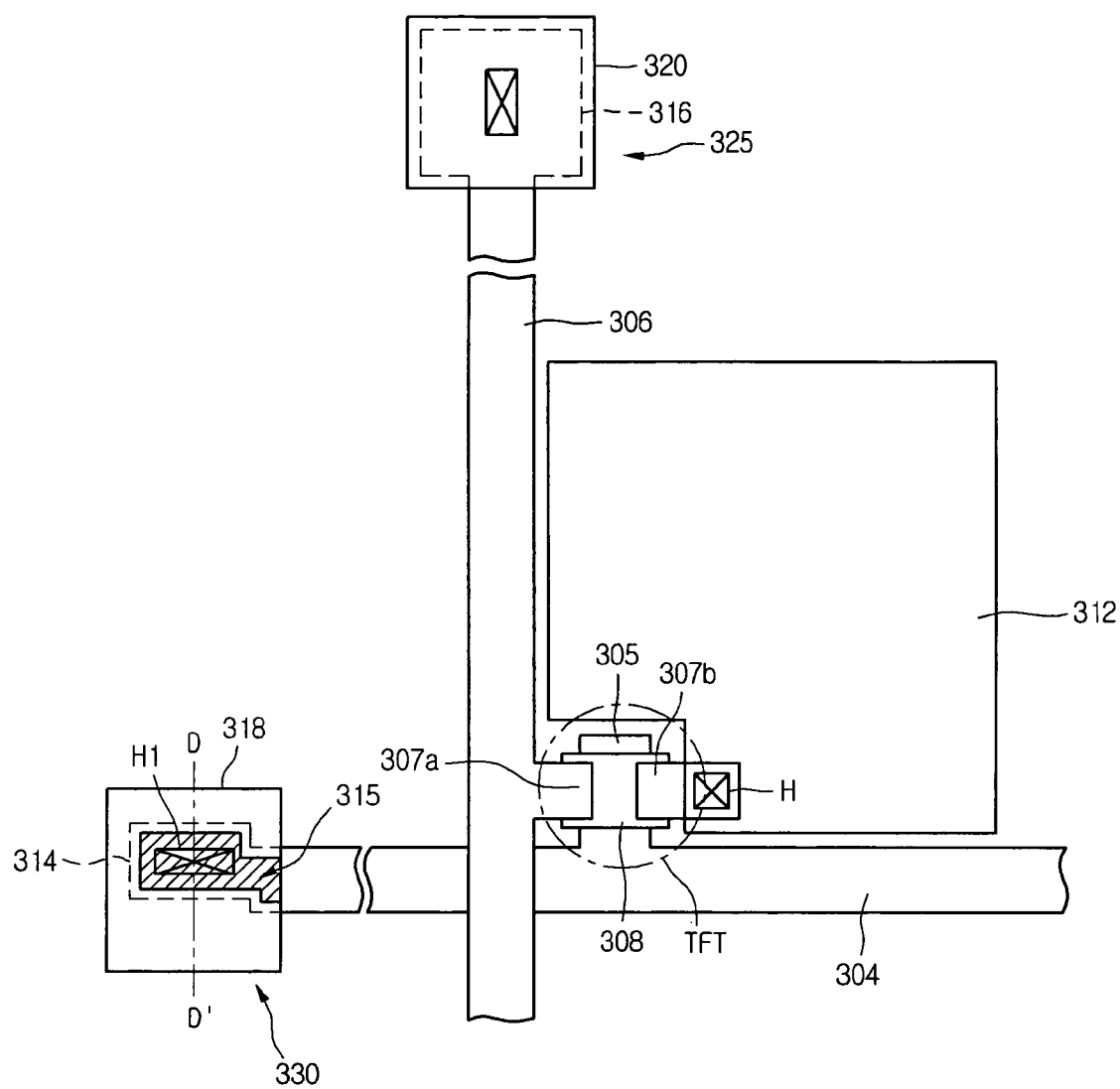
FIG. 8 is a plan view of a first substrate of a liquid crystal display device according to a third embodiment of the present invention.

FIG. 8 is a plan view of a first substrate of a liquid crystal display device according to a third embodiment of the present invention.

As shown in FIG. 8, a pixel region is defined by crossly arranging a gate line 304 and a data line 306 on a first substrate. A thin film transistor (TFT) is formed at the crossing of the gate line 304 and the data line 306. A gate pad 330 is formed on the first substrate to be connected to the gate line 304, and a data pad 325 is formed on the first substrate to be connected to the data line 306.

The liquid crystal display device according to the third embodiment has a similar configuration and many identical elements compared to that of the second embodiment. Therefore, detailed descriptions thereof are omitted.

The gate pad 330 is connected to a gate driver (not shown) and supplies a scan signal to the gate line 304. The gate pad 330 includes a gate ITO electrode 315 made of a transparent conductive metal such as ITO, a gate bottom electrode 314 formed on a predetermined region of the gate ITO electrode extended from the gate line 304, and a gate pad top electrode 318 connected to the gate pad bottom electrode 314 through one contact hole H1.

Figure 9:
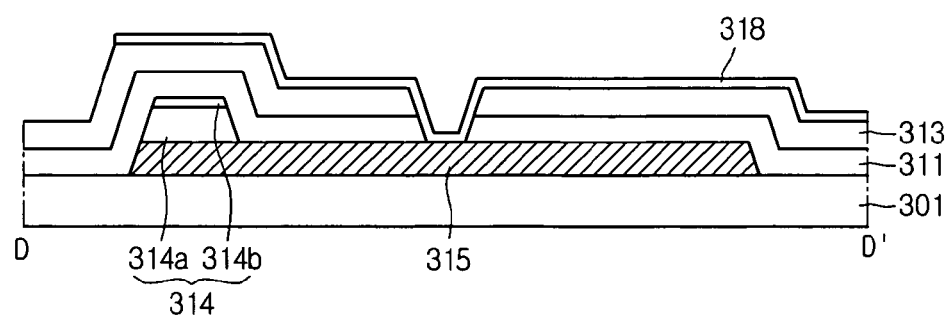
FIG. 9 is a cross-sectional view of FIG. 8 taken along a line D-D'.

FIG. 9 is a cross-sectional view of FIG. 8 taken along a line D-D'.

As shown in FIG. 9, a gate pad bottom electrode 314 is formed at one side of a gate ITO electrode 315, which is distinguished from those shown in FIG. 7. The gate pad bottom electrode 314 is configured of a first gate pad bottom electrode 314a and a second gate pad bottom electrode 314b.

Other processes for fabricating a liquid crystal display device according to the third embodiment are identical to those of the first embodiment described with reference to FIG. 4 and FIGS. 5A through 5C. Therefore, detailed descriptions thereof are omitted.

A gate insulating layer 311 is formed on a substrate 301 where the second gate pad bottom electrode 314b is formed, and a passivation layer 313 is formed on the substrate 301 where the gate insulating layer 311 is formed. A contact hole H1 is formed on the passivation layer 313 to expose a center of the gate ITO electrode 315. A gate pad top electrode 318 is formed on the contact hole H1 to be connected to the gate ITO electrode 315 through the contact hole H1.

The gate ITO electrode 315 is connected to the gate pad top electrode 318, and the first gate pad bottom electrode 314a formed on the gate ITO electrode 315 is patterned not to be connected to the gate pad top electrode 318.

The gate pad top electrode 318 and the gate ITO electrode 315 are made of a metal such as ITO and IZO, and the first gate pad bottom electrode 314a is made of aluminum or aluminum alloy. The second gate pad bottom electrode 314b is made of molybdenum and molybdenum alloy.

Although moisture in external air penetrates to the gate ITO electrode 315 through the gate pad top electrode 318 that is externally exposed, the gate ITO electrode 315 is not corroded by the penetrated moisture.

Accordingly, the corrosion problem of conventional LCD is not arisen because the gate ITO electrode 315 is not corroded by the moisture although the moisture penetrates to the gate ITO electrode 315 through the gate pad top electrode 318.

The method of fabricating a liquid crystal device according to the third embodiment comprises forming the first gate pad bottom electrode not to be connected to the gate pad top electrode by forming the gate ITO electrode on the substrate when the gate pad is formed in order to prevent the first gate pad bottom electrode from being corroded.

Figure 10:
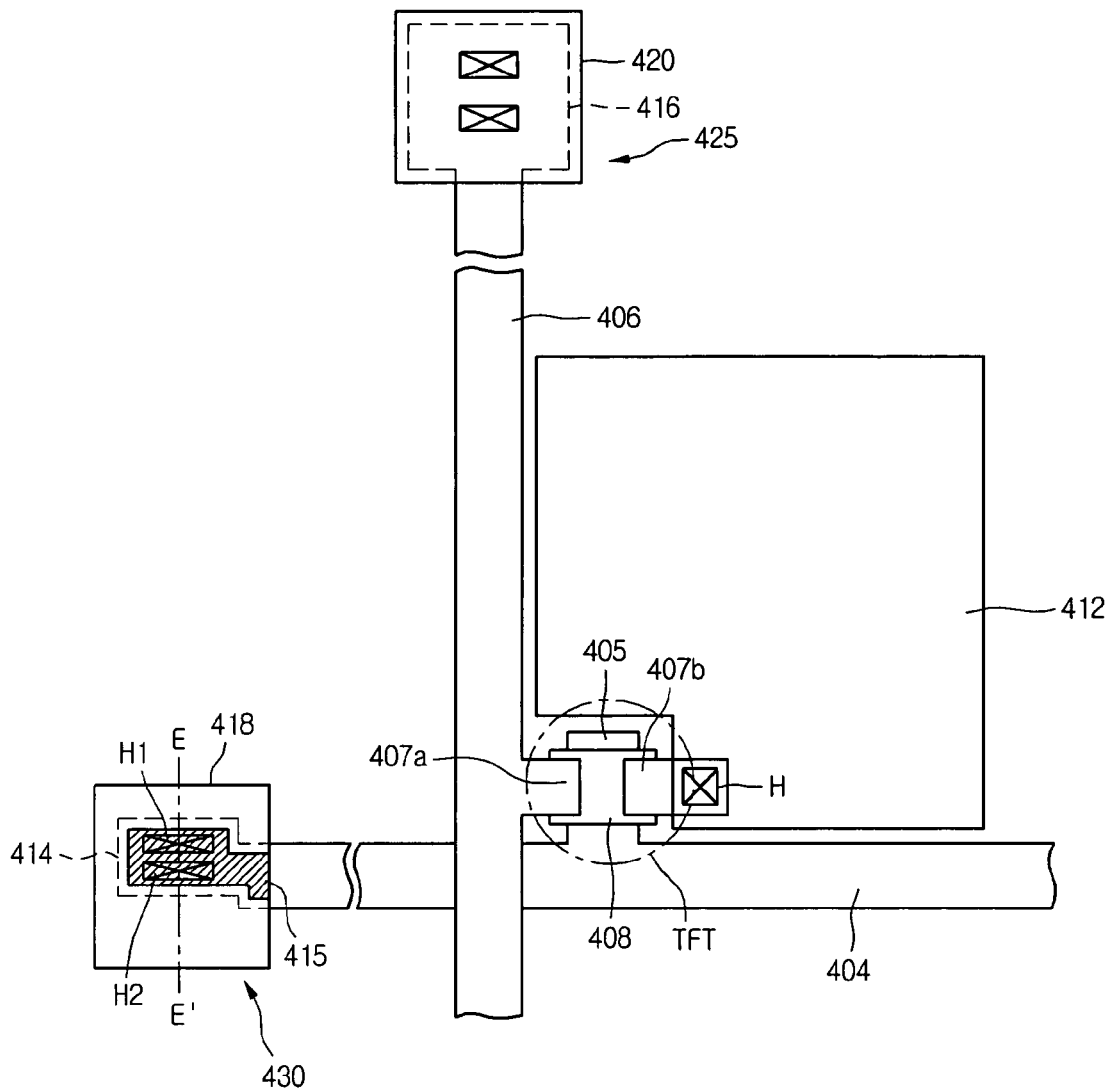
FIG. 10 is a plan view of a first substrate according to a fourth embodiment of the present invention.

FIG. 10 is a plan view of a first substrate according to a fourth embodiment of the present invention.

As shown in FIG. 10, a pixel region is defined by crossly arranging a gate line 404 and a data line 406 on the first substrate, and a thin film transistor (TFT) is formed at the crossing of the gate line 404 and the data line 406. Also, a gate pad 430 is formed on the first substrate to be connected to the gate line 404, and a data pad 425 is formed on the first substrate to be connected to the data line 406.

The liquid crystal display device according to the fourth embodiment has a similar configuration and identical elements compared to that of the third embodiment. Therefore, detailed descriptions thereof are omitted.

The gate pad 430 is connected to a gate driver (not shown) and supplies a scan signal to the gate line 404. The gate pad 430 includes a gate ITO electrode 415 made of a transparent conductive metal ITO, a gate pad bottom electrode 414 formed on a predetermined region of the gate ITO electrode 415 extended from the gate line 404, and a gate pad top electrode 418 connected to the gate pad bottom electrode 414 through a plurality of contact holes H1 and H2. Herein, the gate pad 430 may include at least tow contact holes H1 and H2.

Figure 11:
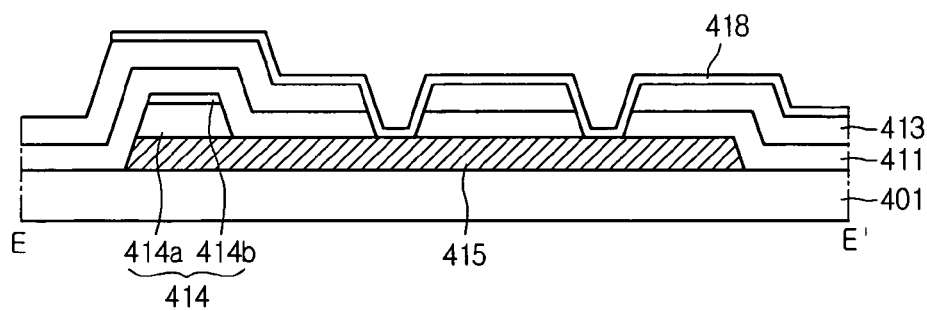
FIG. 11 is a cross-sectional view of FIG. 10 taken along a line E-E'.

FIG. 11 is a cross-sectional view of FIG. 10 taken along a line E-E'.

As shown in FIG. 11, a gate pad bottom electrode 414 is formed at one side region of the ITO electrode 415 which is distinguished from those shown in FIG. 7. Herein, the gate pad bottom electrode 414 is configured of a first gate pad bottom electrode 414a and a second gate pad bottom electrode 414b.

Other processes for fabricating a liquid crystal display device according to the fourth embodiment are identical to those of the first embodiment described with reference to FIG. 4 and FIGS. 5A through 5C. Therefore, detailed descriptions thereof are omitted.

A gate insulating layer 411 and a passivation layer 413 are sequentially formed on the second gate pad bottom electrode 414b. A plurality of contact holes H1 and H2 is formed on the passivation layer 413, and a gate pad top electrode 418 is formed on the plurality of the contact holes H1 and H2.

The gate ITO electrode 415 is electrically connected to the gate pad top electrode 415, and the first gate pad bottom electrode 414a is not electrically connected to the gate pad top electrode 418.

Therefore, the corrosion problem of the conventional LCD device does not arise because the gate ITO electrode 415 is not corroded by the moisture although the moisture penetrates the gate ITO electrode 315 through the gate pad top electrode 418.

The method of fabricating a liquid crystal device according to the fourth embodiment comprises forming the first gate pad bottom electrode not to be connected to the gate pad top electrode by forming the gate ITO electrode on the substrate when the gate pad is formed in order to prevent the first gate pad bottom electrode from being corroded.

As described above, the method of fabricating the liquid crystal display device according to the present invention forms the gate ITO electrode on the substrate when the gate pad is formed in order to connect the gate ITO electrode and the gate pad top electrode. Therefore, the liquid crystal display device and the method thereof according to the present invention improve reliability of gate pad by preventing the corrosion of the gate pad.

Although the embodiments above describe liquid crystal display device with improved gate pad design and fabrication method using the same, the present invention is not limited thereto. Other preferred embodiments include liquid crystal display device with improved data pad design and fabrication method using the same.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display device comprising:
   a gate pad that includes a gate ITO electrode formed on a substrate,
   a first gate pad bottom electrode and a second gate pad bottom electrode formed on a first predetermined region of the gate ITO electrode,
   a gate insulating layer formed on the first gate pad bottom electrode and the second gate pad bottom electrode,
   a passivation layer formed on the gate insulating layer, a gate pad top electrode formed on the passivation layer, and
   two contact holes to connect the gate pad top electrode to the gate ITO electrode at a second predetermined region of the gate ITO electrode different from the first predetermined region such that the first and second gate pad bottom electrodes do not contact the gate pad top electrode; and
   a liquid crystal panel having a gate line that has a dual structure integrally formed with the first gate pad bottom electrode and the second gate pad bottom electrode,
   wherein the gate pad top electrode is directly on gate ITO electrode,
   wherein the first and second gate pad bottom electrodes are formed on a left side and a right side of the gate ITO electrode.

2. The liquid crystal display device according to claim 1, wherein the gate pad top electrode is made of a material identical to the gate ITO electrode.

3. The liquid crystal display device according to claim 1, wherein the first gate pad bottom electrode is made of aluminum group material and the second gate pad bottom electrode is made of molybdenum group material.

4. The liquid crystal display device according to claim 1, wherein the first gate pad bottom electrode and the second gate pad bottom electrode are surrounded by the insulating layer and the passivation layer.

5. A method of fabricating a liquid crystal display device comprising:
   forming a gate ITO electrode on a substrate;
   forming a first gate metal and a second gate metal on the gate ITO electrode;
   forming a first gate pad bottom electrode and a second gate pad bottom electrode on a first predetermined region of the gate ITO electrode;
   forming a gate insulating layer and a passivation layer on the first gate pad bottom electrode and the second gate pad bottom electrode;
   etching a predetermined region of the gate insulating layer and the passivation layer to expose a second predetermined region of the gate ITO electrode;
   forming a gate pad top electrode on the exposed gate insulating layer and the passivation layer; and
   forming two contact holes on the passivation layer for electrically connecting the gate ITO electrode to the gate pad top electrode at the second predetermined region of the gate ITO electrode such that the first and second gate pad bottom electrodes do not contact the gate top electrode,
   wherein the gate pad top electrode is directly on gate ITO electrode,
   wherein the first and second gate pad bottom electrodes are formed on a left side and a right side of the gate ITO electrode.

6. The method according to claim 5, the step of forming a first gate pad bottom electrode and a second gate pad bottom electrode on a predetermined region of the gate ITO electrode comprising:
   coating a photo-resist on the first gate metal and the second gate metal; and
   patterning the first gate metal and the second gate metal.

7. The method according to claim 5, wherein the gate ITO electrode is made of material identical to the gate pad top electrode.

8. The method according to claim 5, wherein the first gate pad bottom electrode is made of aluminum group material and the second gate pad bottom electrode is made of a molybdenum group material.

9. The method according to claim 5, wherein the first gate pad bottom electrode and the second gate pad bottom electrode are surrounded by the insulating layer and the passivation layer.

10. A method of fabricating a liquid crystal display device, comprising:
   forming a first metal layer, a second metal layer and a third metal layer on a substrate in sequence;
   forming a gate electrode, a gate line and a gate pad on the substrate, the gate pad having at least a gate pad bottom electrode;
   forming a passivation layer on the substrate where the gate electrode is formed;
   forming a gate pad top electrode on the passivation layer at the gate pad region;
   forming two contact holes on the passivation layer for electrically connecting the gate electrode to the gate pad top electrode such that no gate pad bottom electrode contacts the gate top electrode, wherein the contact hole is formed in a predetermined region of the gate electrode different from that of the gate pad bottom electrode; and
   forming a pixel electrode in a pixel region,
   wherein the gate pad includes a gate ITO electrode made of the first metal layer, a dual-layered electrode configured of a first gate pad bottom electrode and a second gate pad bottom electrode which are made of the second metal layer and the third metal layer formed on the gate ITO electrode, respectively,
   wherein the gate pad top electrode is directly on gate ITO electrode,
   wherein the first and second gate pad bottom electrodes are formed on a left side and a right side of the gate ITO electrode.

11. The method according to claim 10, the steps of forming a pixel electrode in a pixel region and forming a gate pad top electrode at the gate pad region comprising:
   forming a transparent metal layer on the passivation layer and etching the resulting structure.

12. The method according to claim 10, wherein the first metal layer is ITO or IZO.

13. The method according to claim 10, wherein the second metal layer is aluminum or aluminum alloy.

14. The method according to claim 10, wherein the third metal layer is molybdenum or molybdenum alloy.

15. The method according to claim 10, wherein the step of forming a gate electrode, a gate line and a gate pad on the substrate comprises a photo process and a patterning process.

16. The method according to claim 15, wherein the photo process and the patterning process are simultaneously performed.

17. The method according to claim 10, the step of forming a gate electrode, a gate line and a gate pad on the third metal layer comprising a mask process, wherein the mask used in the mask process is a diffraction exposure mask or a halftone mask each of which includes a transmitting portion, a shielding portion and a semi-transmitting portion.

18. The method according to claim 10, wherein one or more of the dual-layered electrode configured of the first gate pad bottom electrode and the second gate pad bottom electrode is formed on the gate ITO electrode.

19. The method according to claim 10, wherein the gate pad top electrode is made of a material identical to the gate ITO electrode.

20. The method according to claim 10, wherein the gate ITO electrode is connected to the gate pad top electrode through the two contact holes.

21. The method according to claim 10, wherein the first gate pad bottom electrode and the second gate pad bottom electrode are not connected to the gate pad top electrode.

22. The method according to claim 10, wherein the first gate pad bottom electrode and the second gate pad bottom electrode are surrounded by the insulating layer and the passivation layer.

23. The method according to claim 10, further comprising forming a gate insulating layer after forming the gate electrode.

24. The method according to claim 10, further comprising forming a channel layer and a source electrode and a drain electrode after forming the gate electrode.

25. The method according to claim 24, wherein the channel layer and the source electrode and the drain electrode are formed at the same time or through performing several independent processes.

26. A method of fabricating a liquid crystal display device, comprising:
   forming a first metal layer, a second metal layer and a third metal layer on a substrate in sequence;
   forming a data electrode, a data line and a data pad on the substrate, the data pad having at least a data pad bottom electrode;
   forming a passivation layer on the substrate where the data electrode is formed;
   forming a data pad top electrode on the passivation layer at the data pad region;
   forming two contact holes on the passivation layer for electrically connecting the data electrode to the data pad top electrode such that no data pad bottom electrode contacts the data pad top electrode, wherein the contact hole is formed in a predetermined region of the data electrode different from that of the data pad bottom electrode; and
   forming a pixel electrode in a pixel region,
   wherein the data pad includes a data ITO electrode made of the first metal layer, a dual-layered electrode configured of a first data pad bottom electrode and a second data pad bottom electrode which are made of the second metal layer and the third metal layer formed on the data ITO electrode, respectively,
   wherein the data pad top electrode is directly on data ITO electrode,
   wherein the first and second data pad bottom electrodes are formed on a left side and a right side of the data ITO electrode.

27. The method according to claim 26, the steps of forming a pixel electrode in a pixel region and forming a data pad top electrode at the data pad region comprising:
   forming a transparent metal layer on the passivation layer and etching the resulting structure.

28. The method according to claim 26, wherein the first metal layer is ITO or IZO.

29. The method according to claim 26, wherein the second metal layer is aluminum or aluminum alloy.

30. The method according to claim 26, wherein the third metal layer is molybdenum or molybdenum alloy.

31. The method according to claim 26, wherein the step of forming a data electrode, a data line and a data pad on the third metal layer comprises a photo process and a patterning process.

32. The method according to claim 31, wherein the photo process and the patterning process are simultaneously performed.

33. The method according to claim 26, the step of forming a data electrode, a data line and a data pad on the third metal layer comprising a mask process, wherein the mask used in the mask process is a diffraction exposure mask or a halftone mask each of which includes a transmitting portion, a shielding portion and a semi-transmitting portion.

34. The method according to claim 26, wherein one or more of the dual-layered electrode configured of the first data pad bottom electrode and the second data pad bottom electrode is formed on the data ITO electrode.

35. The method according to claim 26, wherein the data pad top electrode is made of a material identical to the data ITO electrode.

36. The method according to claim 26, wherein the data ITO electrode is connected to the data pad top electrode through the two contact holes.

37. The method according to claim 26, wherein the first data pad bottom electrode and the second data pad bottom electrode are not connected to the data pad top electrode.

38. The method according to claim 26, wherein the first data pad bottom electrode and the second data pad bottom electrode are surrounded by the insulating layer and the passivation layer.

39. The method according to claim 26, further comprising forming a data insulating layer after forming the data electrode.

40. The method according to claim 26, further comprising forming a channel layer and a source electrode and a drain electrode after forming the data electrode.

41. The method according to claim 40, wherein the channel layer and the source electrode and the drain electrode are formed at the same time or through performing several independent processes.

* * * * *